United States Patent [19]
Osterried et al.

[11] Patent Number: 5,770,924
[45] Date of Patent: Jun. 23, 1998

[54] IGNITIONAL RUN CIRCUIT THAT IMMEDIATELY APPLIES ONLY A DC VOLTAGE AFTER LAMP IGNITION BUT BEFORE THE MAIN AC POTENTIAL IS APPLIED

[75] Inventors: Josef Osterried, Ottobrunn; Andreas Huber, Maisach; Alwin Veser, Munich; Frank Hansmann, Barsinghausen, all of Germany

[73] Assignee: Patent-Treuhand-Gesellschaft F. Elektrische Gluehlampen mbH, Munich, Germany

[21] Appl. No.: 610,634

[22] Filed: Mar. 4, 1996

[30] Foreign Application Priority Data

Mar. 17, 1995 [DE] Germany .................... 195 09 832.3

[51] Int. Cl.$^6$ ..................................... H05B 37/02
[52] U.S. Cl. ...................... 315/175; 315/289; 315/307
[58] Field of Search .................. 315/174, 175, 315/86, DIG. 7, 289, 290, 307, 308, 291

[56] References Cited

U.S. PATENT DOCUMENTS

| | | | |
|---|---|---|---|
| 4,587,460 | 5/1986 | Murayama et al. | 315/174 |
| 4,709,188 | 11/1987 | Roberts | 315/307 |
| 5,103,143 | 4/1992 | Daub | 315/308 |
| 5,444,336 | 8/1995 | Ozawa et al. | 315/307 |
| 5,465,029 | 11/1995 | Hanazaki et al. | 315/307 |

FOREIGN PATENT DOCUMENTS 0 411 617   2/1991   European Pat. Off. .

OTHER PUBLICATIONS

Electronic ballast unit made by Philips, product designation EMC 035S and EMC 070S, respectively, published Oct. 1994.

*Primary Examiner*—Robert Pascal
*Assistant Examiner*—Michael Shingleton
*Attorney, Agent, or Firm*—Frishauf, Holtz, Goodman, Langer & Chick, P.C.

[57] ABSTRACT

To largely, or entirely inhibit glow discharges during the start-up or run-on phase (Ta) of a high-pressure discharge lamp, the lamp is operated in a second time period (T2) immediately after ignition (T1) with continuous direct current during which the electrode of the lamp which then functions as an anode has reached emission temperature; in a third time period (T3), the polarity of the direct current is reversed and the other electrode, which now will function as an anode, is heated to emission temperature; thereafter, alternating current energy is supplied to both electrodes, typically in frequencies between 90 and 150 Hz. A suitable second time period (T2) can be about 2 to 2½ second, the third time period (T3) being shorter. The total warm-up time may extend to a minute or more; current being supplied during the second, third and subsequent periods is usually higher, for example by a factor of 1.5 of the normal or rated operating current.

20 Claims, 5 Drawing Sheets

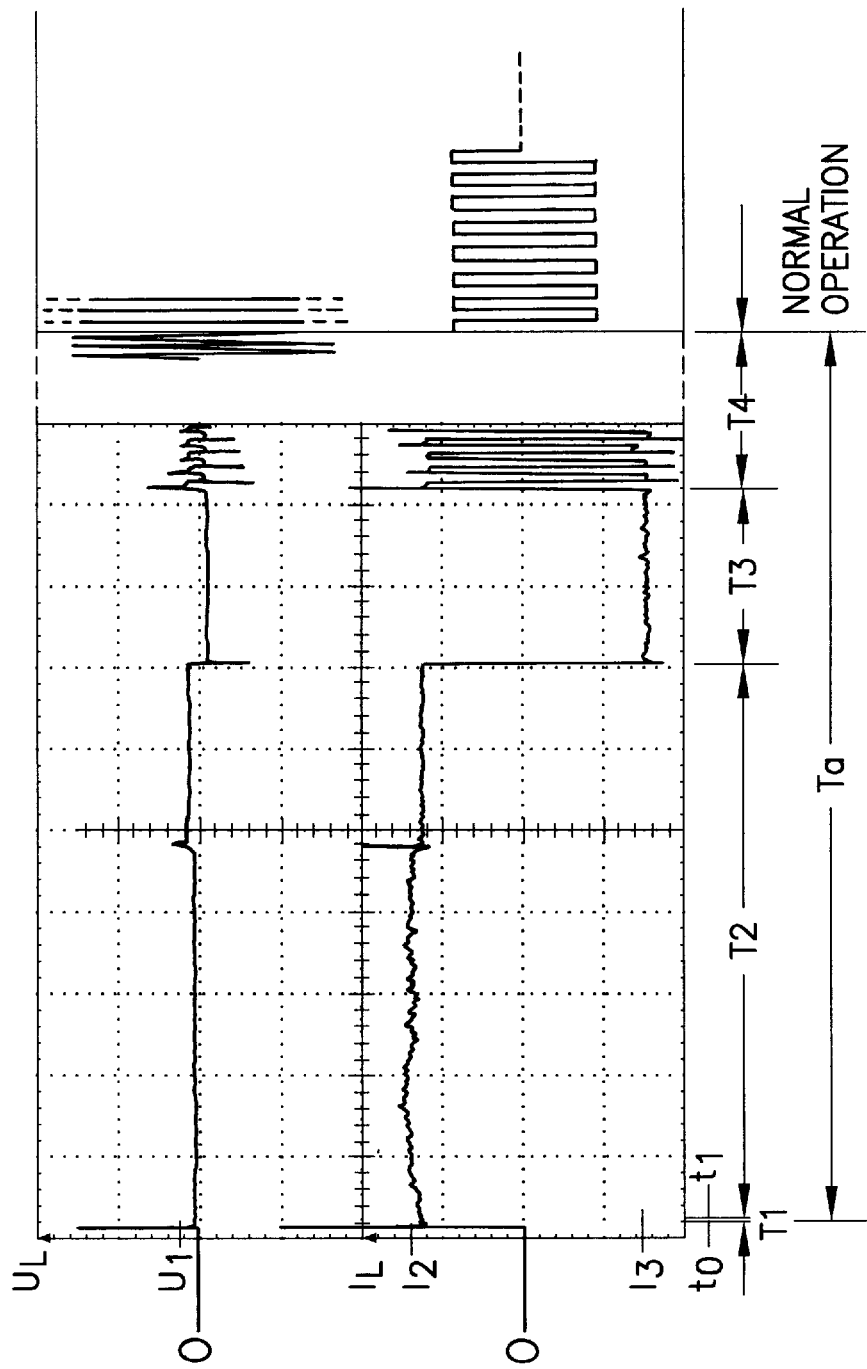

5,770,924

IGNITIONAL RUN CIRCUIT THAT IMMEDIATELY APPLIES ONLY A DC VOLTAGE AFTER LAMP IGNITION BUT BEFORE THE MAIN AC POTENTIAL IS APPLIED

FIELD OF THE INVENTION

The present invention relates to a method, and to a circuit or system, to operate a discharge lamp, and particularly a high-pressure discharge lamp including an initial energization phase, a run-on or warm-up phase, and then a normal operation phase.

BACKGROUND

Discharge lamps and particularly high-pressure discharge lamps are started by operating the lamp in a run-on or warm-up phase with alternating current at a frequency of between about 90 to 150 Hz on which starting or firing or ignition pulses are superimposed. An electronic ballast, or accessory or operating circuit of this type is commercially available by Philips, product designation EMS 035S or EMC 070S, respectively. The alternating supply energy has ignition pulses, for firing, superimposed thereon. At the most after a half period of the operating frequency, lamp voltage and lamp current are reversely polarized. Assuming an operating frequency of 90 Hz, this results in repolarization or change of polarization after 5.5 ms. At that time, the electrodes have a temperature which is not yet suitable for thermal emission of electrons. At the repolarization of the lamp voltage and lamp current, the lamp has the tendency to extinguish; it may operate, or burn, however, for a few milliseconds with a relatively high arc voltage of about 150 to 250 V in a glow discharge.

Glow discharges in discharge lamps have various disadvantages. A glow discharge results in substantial material removal from that electrode which forms the cathode at any time. The removed material precipitates on or deposits on the lamp bulb, resulting in blackening of the lamp bulb. Blackening of the lamp bulb, of course, decreases the light output of the lamp. The undesired effect of the glow discharge occurs at each change of polarization, as long as the electrodes have not yet reached electron emission temperature.

THE INVENTION

It is an object to provide a method, and a circuit or system based on the method to operate a discharge lamp which permits a run-on phase in which the probability of the occurrence of a glow discharge is substantially decreased or actually inhibited or, in which at least the time span during which a glow discharge may occur is shortened.

Briefly, during a first time period, which can be extremely short, firing pulses are supplied to the lamp and the, immediately after firing and during a second time period, the lamp is operated with direct current energy polarized in a first direction. During a third time period, the polarity of the direct current is reversed, and the lamp is operated during a third time period with this now reversed direction. After the third time period, the lamp is operated with alternating current energy at the desired frequency of operation.

The second and third time periods are selected to be long enough to permit the electrode which operates as an anode at that time to reach emission temperature; a suitable time for the second time period is between about 300 to 500 ms, and the third time period, usually, is shorter, about 100 to 200 ms. The operating current during the second and third time periods is higher than normal current, at least 1.5 times normal operating current.

In accordance with a feature of the invention, the starting or accessory or ballast circuit can be of standard form but, in addition to the standard circuit, includes a starting, or run-on control circuit for controlling the energy supplied to the lamp in form of direct current of a first polarity during the second time period and of reverse polarity during the third time period. A sensing circuit can be provided which controls the time periods, based on sensing lamp voltage.

The method and the system in accordance with the present invention have several advantages. The probability of the occurrence of a glow discharge is substantially decreased. With optimal dimensioning of the circuit components, that is, with optimal arrangement of the respective second and third time periods, matched to the particular lamp, glow discharges can be entirely inhibited. As a result, the lifetime of the discharge lamp is increased, since material removal due to glow discharge is decreased or entirely inhibited; further, blackening of the lamp bulb is substantially decreased or entirely eliminated.

DRAWINGS

FIG. 2A is a schematic diagram similar to FIG. 2, to an even more compressed scale, to schematically also illustrate current levels at normal operation, in which the voltage levels are not shown to scale.

DETAILED DESCRIPTION

Figure 1:
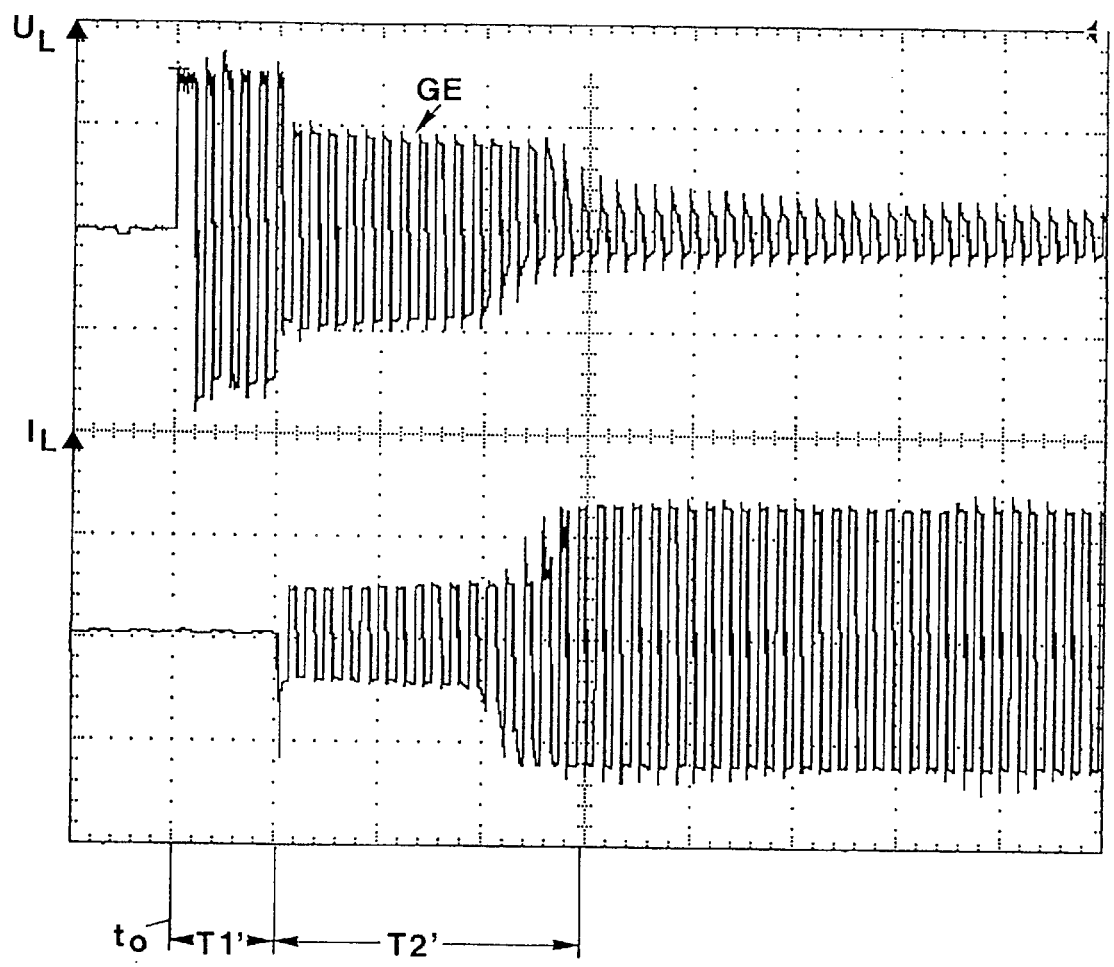
FIG. 1 is a timing diagram illustrating voltage and current flow to the lamp with respect to time in accordance with the prior art.

Discharge lamps, particularly high-pressure discharge lamps, are operated, when first energized at the time to (FIG. 1) with alternating voltage having a standard operating frequency, for example, 90 to 150 Hz. FIG. 1 schematically illustrates, in the upper-half of the drawing, lamp voltage $U_L$ (in 200 V/unit) and in the lower-half the lamp current $I_L$, at 2 A/unit, to operate a high-pressure discharge lamp of 150 W rating. In this method of operation according to the prior art, the lamp receives at the time instant of energization, $t_0$, a voltage $U_L$ with nominal frequency. In a first time period T1', ignition pulses are superimposed over this voltage at nominal frequency. The ignition pulses are not shown in FIG. 1, for simplicity of the drawings; they are extremely short, having a width of from 1–2 microseconds, and an amplitude of between about 4 and 4.5 KV. In the drawing of FIG. 1, each time division is 50 milliseconds.

A time period T2' follows the time T1'. During the polarity reversal of the lamp voltage, glow discharges occur which are shown schematically in FIG. 1 as GE. These glow discharges may occur until the electrodes have reached emission temperature, which then forms the end of the time period T2'. Typical values for glow discharges are in the range of between about 150 to 250 V. Each glow discharge results in some material removal from that one of the electrodes which forms the cathode at that time.

Following the time period T2', lamp voltage increases from 10 to 20 V to up and over nominal value, and the lamp current drops to its nominal or design value. The time interval after T2' corresponds to a time interval T4 in accordance with a method of the present invention, and has a duration of about two minutes.

Figure 2:
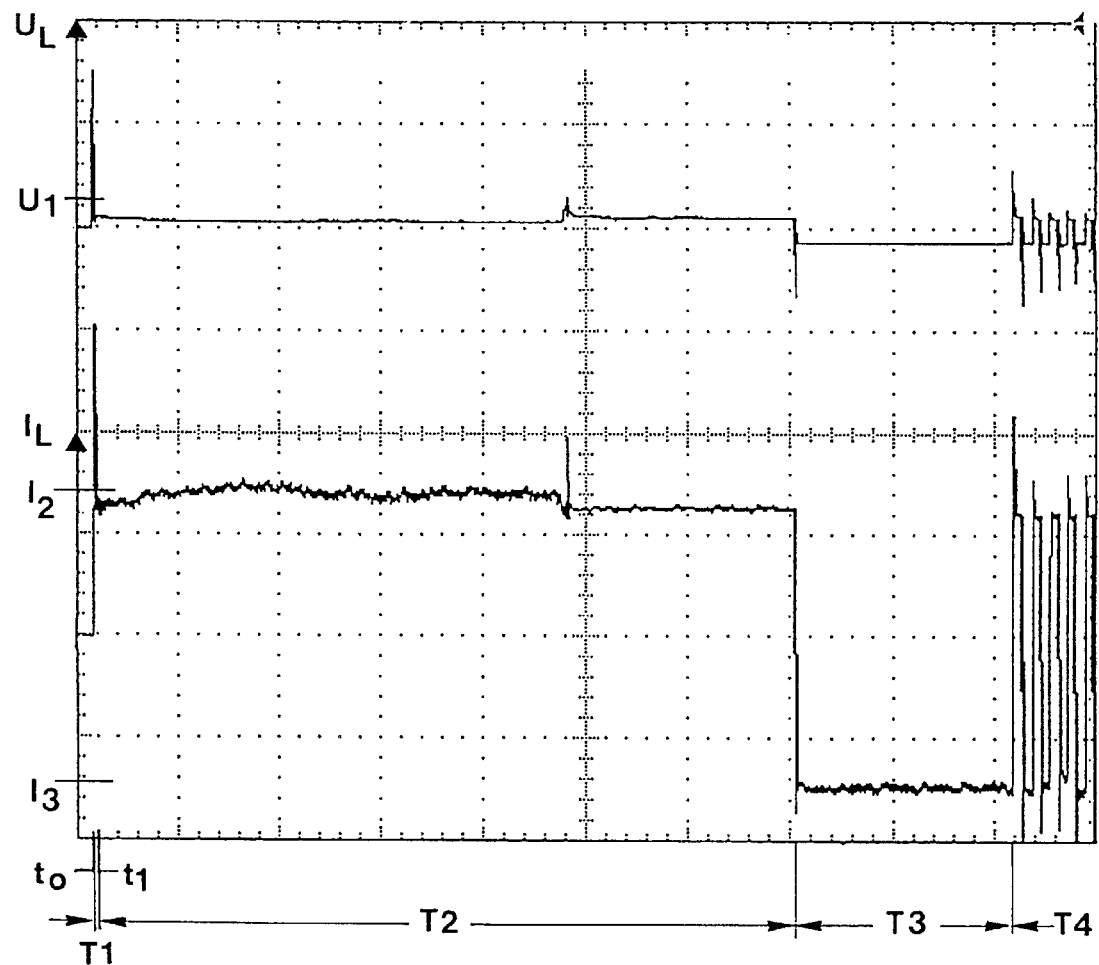
FIG. 2 is a timing diagram, to a compressed scale, illustrating voltages and currents to the lamp in accordance with the present invention.
Figure 3:
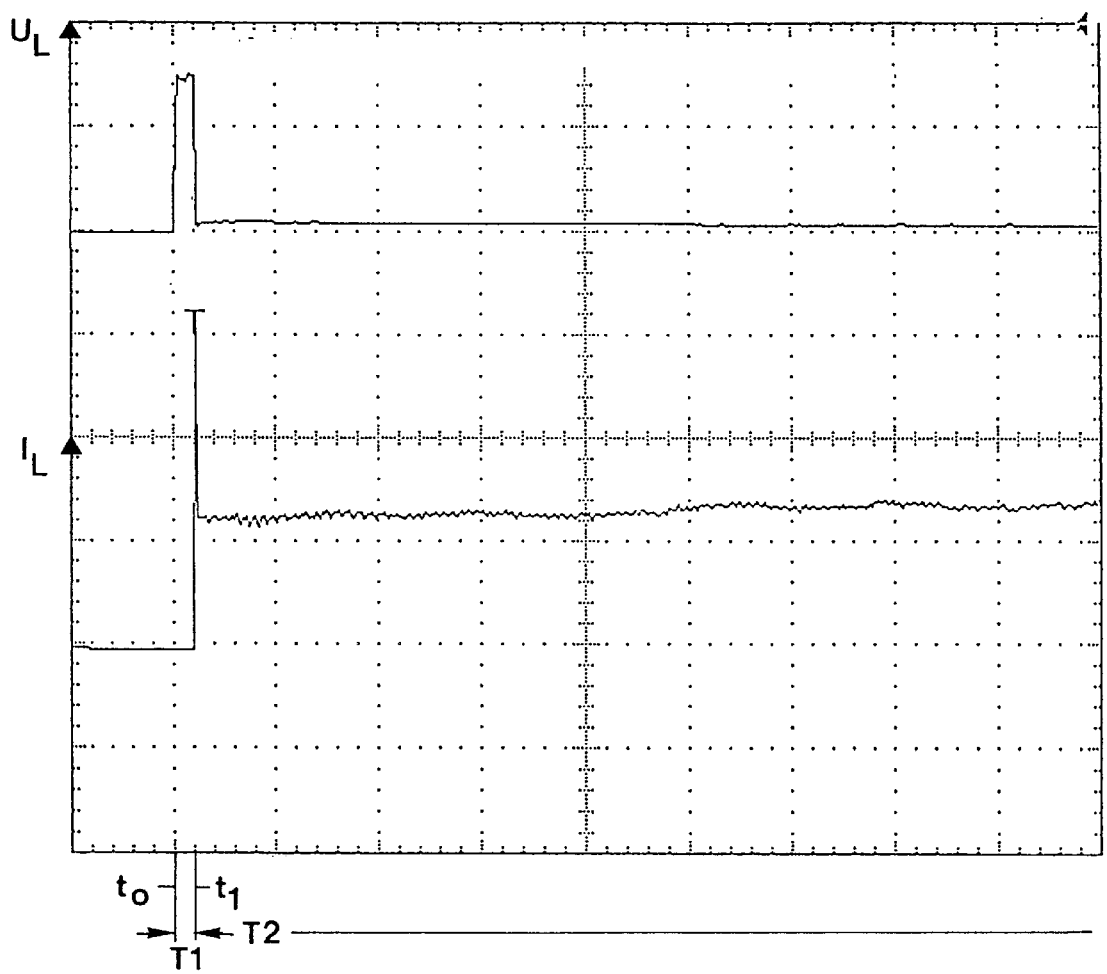
FIG. 3 is a fragmentary enlarged view of FIG. 2.

The voltage and current in accordance with the method of the present invention are shown in FIGS. 2 and 3. In FIG. 2, the upper portion illustrates lamp voltage $U_L$, at 200 V/unit, and the lower portion lamp current $I_L$ at 2 A/unit. The diagram, again, is for a 150 W high-pressure discharge lamp.

The circuit to carry out the method is, in contrast to the prior art, at the time instant $t_0$, FIG. 2, not operated with alternating current, or, respectively, not operated at nominal network alternating frequency. Rather, the entire run-on or warm-up period Ta, including ignition, is subdivided in four different time periods T1 to T4, so that:

$$Ta=T1+T2+T3+T4.$$

In the time interval T1, the discharge lamp receives a direct current voltage $U_1$ with an amplitude of typically about 280 to 350 V. Ignition pulses are superimposed over this direct voltage $U_1$ until the lamp breaks down, or fires, which occurs, in accordance with FIG. 3, at time instant t1. The ignition pulses are not shown in FIG. 2 for clarity, as mentioned above in connection with FIG. 1. In the time internal T1, no lamp current flows as yet. The time interval or time period T1 is only about 1 ms long. FIG. 3 illustrates the time interval T1 to an enlarged scale.

The time interval or period T2 starts as soon as the lamp fires or ignites. The discharge lamp is then operated with a direct current $I_2$ polarized in a first direction. The voltage is typically 10 to 20 V. The time period T2, typically, is 300 to 500 ms long. FIG. 2 illustrates the time period T2 to be 350 ms. The current $I_2$, typically, is 1.5 times nominal or rated operating current, that is, when the lamp operates normally, and after the warm-up period, that is, subsequent to the time period T4. The current $I_2$ may be higher, for example between 1.5 to 2 times nominal or rated current.

After the time interval or period T2, a time interval T3 begins, in which the discharge lamp is operated with a direct current $I_3$ reversely polarized with respect to current $I_2$. Voltage, again, is typically between 10 to 20 volts. Usually, the time period T3 is shorter than the time period T2, and, typically, is between about 100 and 200 ms; FIG. 2 illustrates this time period to be 110 ms. The direct current $I_3$, also typically, is higher than nominal operating current and, in the example, 1.5 times nominal current, that is, current in normal operation following the time interval T4. Again, this current may be between 1.5 and 2 times nominal current.

When the time period T3 has ended and, starting with the beginning of the time period T4, the discharge lamp receives alternating current having the nominal frequency of the system, and further, at least 1.5 times nominal current. The alternating voltage, typically, again is 10 to 20 V. The time interval T4 is not shown completely in FIG. 2. During this time period, lamp voltage rises from 10 to 20 V to nominal value of, for example, 80 to 100 V, and lamp current drops to nominal value, for example 1.8 A in a 150 W lamp. The time interval T4, which depends on the relationship of run-on current to nominal current, is about 1 to 2 minutes. In the present example, the factor of run-on current with respect to nominal current is 1.5 to 2.

Operating the lamp with direct current in the time period for intervals T2 and T3 avoids reversal of lamp voltage and, hence, lamp current in those time intervals, so that the probability of a glow discharge which may occur during polarity reversal is decreased or entirely eliminated.

The second time interval T2 is so selected that the lamp electrode which, during this interval is the anode, will be heated to a temperature in which thermal emission of electrons begins, that is, a temperature of for example about 2000° K.

After the third time interval T3 has elapsed, that is, at the start of time interval T4, the lamp will have voltage and current supplied at nominal operating frequency, for example between 90 and 150 Hz.

Usually, the third time interval T3 is shorter than the second time interval T2. The lamp current may be higher during the second and/or third time interval T2, T3, than during the subsequent time interval T4. Usually during the time intervals T2 and T3 lamp current is higher by a factor of 1.5 than nominal lamp current.

Figure 4:
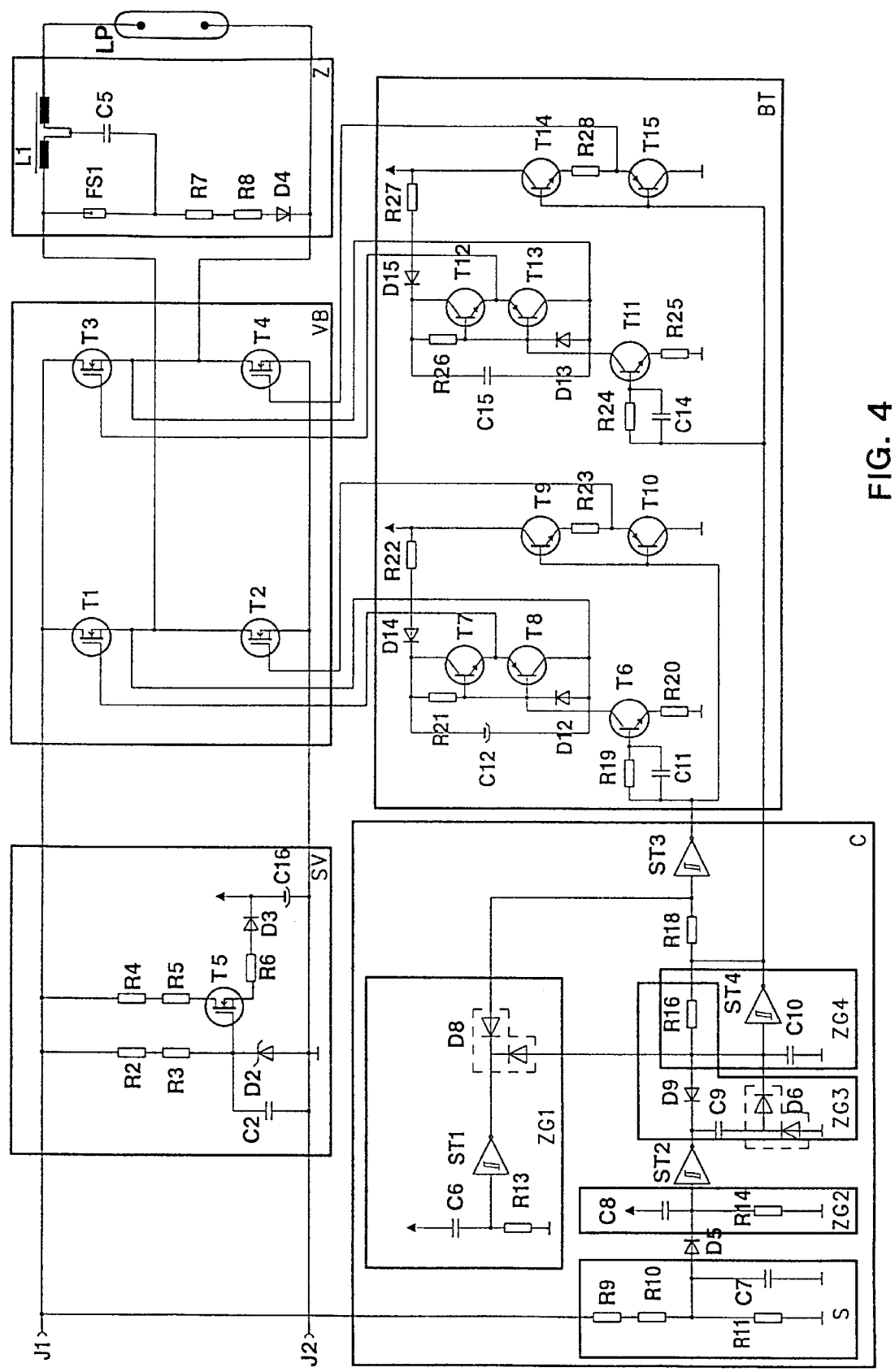
FIG. 4 is a highly schematic circuit diagram of a system and circuit to carry out the method in accordance with the present invention.

SYSTEM AND CIRCUIT CARRYING OUT THE METHOD OF THE PRESENT INVENTION WITH REFERENCE TO FIG. 4

FIG. 4 illustrates an example for a circuit to carry out the method of the present invention, and which forms part of an electronic ballast, or accessory or operating circuit. The system of this circuit is formed by a plurality of circuit blocks, namely, a voltage supply circuit SV, a full-wave bridge VB, a bridge driver circuit BT, an ignition circuit Z, and a control circuit C. The blocks SV, VB, BT and Z can be identical with blocks of this type in commercial circuit arrangements.

In accordance with the present invention, the circuit is expanded by a control unit, or control portion or block C, shown in FIG. 4.

The control portion C has a sensor unit S, and timing elements ZG1, ZG2, ZG3, ZG4. The sensor S is coupled immediately in advance of the timing circuit ZG2, which determines the time interval T2.

The sensor S is used to recognize the value of lamp voltage and includes the resistors R9, R10, R11 and a capacitor C7. Lamp voltage, derived from the voltage divider R9, R10, R11 is applied over a diode D5 to the timing circuit ZG2, which will be described below.

The timing circuit ZG1 is formed by a capacitor C6, a resistor R13, a diode block D8 formed by two diodes, and a Schmitt-trigger ST1. It is used to start, or initialize the bridge driver BT.

INITIALIZATION OF BRIDGE DRIVER BT AND OF BRIDGE VB

Upon first energizing the network, capacitor C6 of timing circuit ZG1 is discharged. The output of Schmitt-trigger ST1 thus will be 0 V. The diodes in the diode block D8 are connected to the Schmitt-trigger ST3, which is connected in series with the timing circuit ZG1, and respectively to a Schmitt-trigger ST4 in the timing circuit ZG4. The Schmitt-triggers ST3 and ST4 control the bridge driver BT to render the power transistors T2 and T4 in the full-wave bridge VB to be conductive, or ON.

After the time constant determined by the RC element R13, C6 has elapsed, Schmitt-trigger ST1 switches its output from 0 to 15 V. The power transistor T2 is turned OFF, and the power transistor T1 is turned ON. Transistor T4 remains ON. The voltage across the input of the full-wave bridge is thus transferred to the output of the bridge circuit VB, and ignition of the discharge lamp LP can begin, initiated by the ignition circuit Z, as well known.

The timing circuit ZG2 has a capacitor C8 and a resistor R14. After the lamp has fired, that is, end of the timing interval T1, which is the beginning of the timing interval T2, see FIGS. 2 and 3, the voltage at the voltage divider of the sensor S and on the anode of diode D5 drops from, for example, about 15 V to 1 V, causing diode D5 to block. The voltage on the cathode of D5 drops from 15 V down to 1 V in accordance with an exponential e– function, with the time constants given by C8 and R14. When the threshold voltage of the Schmitt-trigger ST2 is passed, which Schmitt-trigger is located between the timing circuits ZG2 and ZG3, the Schmitt-trigger ST2 switches at its output from 0 V to 15 V. Schmitt-trigger ST4 switches at its input from 0 V to 15 V and hence at its output from 15 V to 0 V. Schmitt-trigger ST3, connected to the output of Schmitt-trigger ST4, switches at its input from 15 V to 0 V and at its output from 0 V to 15 V.

This causes the full-wave bridge VB to change polarity. Transistors T1 and T4 are switched from ON to OFF; transistors T2 and T3 are switched from OFF to ON. This terminates the time period T2 and starts the time period T3.

The time period for interval T2 is so dimensioned that during this time interval, the electrode which was the anode in the discharge lamp has reached its emission temperature, typically, the time interval T2 is up to about, or even over one-half second.

Switch-over of the Schmitt-trigger ST2 starts the timing circuit ZG3. This timing circuit includes a capacitor C9, a diode block D6 having two diodes connected as shown, and a resistor R16. Capacitor C9 charges over R16 to 15 V.

When the input of the Schmitt-trigger ST4 passes the threshold level thereof, it switches at its output from 0 V to 15 V, whereas Schmitt-trigger ST3 switches its output from 0 V to 15 V. The bridge VB thus is changed in polarization. This terminates the time period T3. The length of the time period is such that the electrode in the discharge lamp LP which then was the anode has reached its emission temperature. The time period T3 typically is shorter than the time period T2 and, for example, is about 200 ms.

The fourth phase, that is the time period T4, is generated by an oscillator formed by the element ZG4, which has a capacitor C10, and a resistor R16, as well as a Schmitt-trigger ST4. This may also be considered a timing circuit, because it switches over at the rate of the nominal frequency. The discharge lamp LP thus receives direct current pulses of alternating polarity, that is, alternating current with nominal or design frequency. The signals from the oscillator ZG4 are supplied to the bridge driver circuit unit BT and hence to the full-wave bridge VB. The bridge VB switches the input voltage $U_E$ with the nominal frequency to the lamp. The steady state operating condition of the lamp is reached then in about 1 to 2 minutes.

The circuit of the invention can be implemented in several ways. For example, individual sub-circuits, circuits shown in discrete form or in blocks, or groups of blocks, can be implemented by suitable composite circuits, in particular by integrated circuits. It is also possible to implement many of the functions, and the signal processing of the circuits shown in digital form. At a high level of integration, it is possible to implement the entire signal processing, especially digital signal processing, of the circuit by one or more integrated circuits. Signal processing steps, for example filtering, comparing, weighting, which may be linear or non-linear, timing, or counting, can be performed digitally by arithmetic calculations. It is also possible to dispose digital, as well as analog signal processor, and other circuits, such as shift registers, flip-flops, Schmitt-triggers, operational amplifiers and the like, within integrated circuits for the implementation of the overall circuit of the present invention, or sub-circuits thereof.

FIGS. 2 and 3 are actual oscillograms and shown not only the currents, but also spurious switching spikes which, however, have no effect on the operation of the lamp in accordance with the present invention. Various changes and modifications may be made within the scope of the inventive concept.

We claim:

1. In a method of starting and operating a discharge lamp having two electron emissive electrodes, said discharge lamp having, in normal operation, a rated operating current, and which, after energization and before operating at rated current, passes through a run-on or warm-up period (Ta), the steps of:
    (a) during a first time period (T1), energizing a circuit which includes the lamps with a direct current polarized in a first direction having ignition pulses superimposed thereover;
    (b) after ignition, and during a second time period (T2), supplying the lamp only with direct current energy, continuously polarized in the first direction;
    (c) during a third time period (T3), operating the lamp with direct current energy, continuously polarized reversely to said first direction;
    (d) after said third time period (T3) and during a fourth time period (T4), operating the lamp with alternating current energy; and then
    (e) operating said lamp with rated alternating current.

2. The method of claim 1, wherein, in step (b), said second time period (T2) is determined by the time interval in which that electrode of said two electrodes of the lamp which is the anode, has reached emission temperature.

3. The method of claim 1, wherein, in step (c), the length of the time period (T3) is determined by the time interval in which that electrode of said two electrodes of the lamp which is the anode, has reached electron emission temperature.

4. The method of claim 2, wherein, in step (c), the length of the time period (T3) is determined by the time interval in which that electrode of said two electrodes of the lamp which is the anode, has reached electron emission temperature.

5. The method of claim 1, wherein, in step (d), the lamp current of the alternating current energy during fourth the time period (T4), and while the lamp is still in run-on or warm-up period (Ta) is higher than said normal rated operating current.

6. The method of claim 1, including a of sensing lamp voltage ($U_L$) and controlling said second time period (T2) as a function of lamp voltage.

7. The method of claim 1, including a step of sensing lamp voltage ($U_L$) and controlling said third time period (T3) as a function of lamp voltage.

8. The method of claim 1, including a step of sensing lamp voltage during said second and third time periods, and controlling the lengths of said time periods as a function of sensed voltage.

9. The method of claim 2, including a step of sensing when that electrode of said two electrodes which is the anode has reached emission temperature, and terminating said second time period (T2) when said emission temperature has been reached.

10. The method of claim 3, wherein, in step (c), said third time period (T3) is determined by the time interval in which that electrode of said two electrodes of the lamp which is the anode, has reached emission temperature, and terminating said third time period (T3) when said emission temperature has been reached.

11. The method of claim 9, wherein, in step (c), said third time period (T3) is determined by the time interval in which that electrode of said two electrodes of the lamp which is the anode, has reached emission temperature, and terminating said third time period (T3) when said emission temperature has been reached.

12. In a circuit system for starting and operating a discharge lamp having two electron emissive electrodes,
   carrying out the method of claim 1,
   circuit means (SV, BT, VB) coupled to the lamp (LP), for providing energy to the lamp;
   an ignition or firing circuit (Z) coupled to the lamp for igniting or firing the lamp; and
   a starting or run-on control circuit (C) for controlling electrical energy supplied to the lamp by said energy providing circuit means (SV, BT, VB),
   said starting or run-on control circuit (C) being coupled to and controlling said energy providing means, to provide during a first time period (T1) ignition pulses to fire the lamp,
   during a second time period (T2) which follows immediately after ignition of the lamp, to provide direct current energy continuously polarized in a first direction,
   during a third time period (T3), to provide direct current energy continuously polarized in a direction which is the reverse of said first direction,
   after said third time period (T3) and during a fourth time period (T4), operating said lamp with alternating current energy, and
   after said fourth time period (T4), supplying alternating current energy to the lamp for operation at rated operating current.

13. The circuit of claim 12, wherein said control circuit (C) controls the length of said second time period (T2) to have a duration in which that one electrode of said two electrodes which is the anode, during said second time period has reached electron emission temperature.

14. The circuit of claim 12, wherein said control circuit (C) controls the length of said third time period (T3) to have a duration in which that one electrode of said two electrodes which is the anode, during said third time period has reached electron emission temperature.

15. The circuit of claim 12, wherein said control circuit (C) controls the current of alternating energy supplied during said fourth time period (T4) and while the lamp is still in the run-on or warm-up period (Ta) to be higher than said normal rated operating current.

16. The circuit of claim 12, further including at least one timing element (ZG2, ZG3) for determining the time duration of at least one of said second and third time periods (T2, T3), and during which said direct current energy of the respective polarity is supplied to the lamp by said circuit means.

17. The circuit of claim 12, further including a sensor (S) connected in said circuit means and sensing lamp voltage, said sensor being part of said control circuit (C).

18. The circuit of claim 16, further including a sensor (S) connected in said circuit means and determining lamp voltage,
   said sensor being connected to at least one of said timing circuits (ZG2, ZG3) to control, at least in part, the time duration determined by the respective timing means.

19. The circuit of claim 12, wherein said control circuit (C) controls the second time period (T2) to be longer than the third time period (T3).

20. The circuit of claim 12, wherein said circuit means (SV, BT, VB) supplies current to said lamp (LP) during at least one of the time periods consisting of said first, second, third and fourth periods (T1, T2, T3, T4) at a level which is higher, optionally by a factor of at least 1.5, than the normal or rated operating current of the lamp (LP).

* * * * *

UNITED STATES PATENT AND TRADEMARK OFFICE
CERTIFICATE OF CORRECTION

PATENT NO. : 5,770,924
DATED : June 23, 1998
INVENTOR(S) : OSTERRIED et al.

It is certified that error appears in the above-identified patent and that said Letters Patent is hereby corrected as shown below:

On the Title page, Item [54], and Column 1, line 2 of the Title
    after "ONLY A", insert --PURE--.

Column 6, line 47 (claim 5, line 2),
    "fourth the" should be --the fourth--.

Signed and Sealed this

Twenty-third Day of February, 1999

Attest:

Q. TODD DICKINSON

*Attesting Officer*    *Acting Commissioner of Patents and Trademarks*